US012266358B2

(12) United States Patent
Miller et al.

(10) Patent No.: US 12,266,358 B2
(45) Date of Patent: Apr. 1, 2025

(54) DYNAMICALLY DETERMINING WHETHER TO PERFORM CANDIDATE AUTOMATED ASSISTANT ACTION DETERMINED FROM SPOKEN UTTERANCE

(71) Applicant: GOOGLE LLC, Mountain View, CA (US)

(72) Inventors: Konrad Miller, Zurich (CH); Ágoston Weisz, Zurich (CH); Herbert Jordan, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 272 days.

(21) Appl. No.: 17/901,513

(22) Filed: Sep. 1, 2022

(65) Prior Publication Data

US 2024/0046925 A1 Feb. 8, 2024

Related U.S. Application Data

(60) Provisional application No. 63/396,108, filed on Aug. 8, 2022.

(51) Int. Cl.
| | |
|---|---|
| *G10L 15/22* | (2006.01) |
| *G06F 40/30* | (2020.01) |
| *G10L 15/26* | (2006.01) |

(52) U.S. Cl.
CPC .............. *G10L 15/22* (2013.01); *G06F 40/30* (2020.01); *G10L 15/26* (2013.01); *G10L 2015/223* (2013.01)

(58) Field of Classification Search
CPC ..... G10L 15/22; G10L 15/1822; G10L 15/26; G10L 17/00; G10L 2015/223
See application file for complete search history.

(56) References Cited

U.S. PATENT DOCUMENTS 8,938,394 B1 * 1/2015 Faaborg .................. G10L 15/22
704/274
11,138,972 B2 * 10/2021 Aggarwal ............... H04L 67/75
(Continued)

FOREIGN PATENT DOCUMENTS

| EP | 3655947 A1 | 5/2020 |
| WO | 2022050973 A1 | 3/2022 |

OTHER PUBLICATIONS

European Patent Office; International Search Report and Written Opinion issued in Application No. PCT/US2022/051175; 24 pages; dated Jun. 2, 2023.

*Primary Examiner* — Vijay B Chawan
(74) *Attorney, Agent, or Firm* — Gray Ice Higdon

(57) ABSTRACT

Implementations perform, independent of any explicit assistant invocation input(s), automatic speech recognition (ASR) on audio data, that is detected via microphone(s) of an assistant device, to generate ASR text that predicts a spoken utterance that is captured in the audio data. The ASR text is processed and candidate automated assistant action(s) that correspond to the command, if any, are generated. For each of any candidate automated assistant action(s), it is determined whether to (a) cause automatic performance of the automated assistant action responsive to the spoken utterance or, instead, (b) suppress any automatic performance of the automated assistant action responsive to the spoken utterance. Such determination can be made based on processing both (i) action feature(s) for the candidate automated assistant action; and (ii) environment feature(s) that each reflects a corresponding current value for a corresponding dynamic state of an environment of the assistant device.

20 Claims, 8 Drawing Sheets

(56) References Cited

U.S. PATENT DOCUMENTS

| | | | |
|---|---|---|---|
| 11,176,928 B2* | 11/2021 | Schairer | G10L 15/22 |
| 11,741,953 B2* | 8/2023 | Beaufays | G10L 15/065 |
| | | | 704/201 |
| 11,756,544 B2* | 9/2023 | Sharifi | G06F 3/0481 |
| | | | 704/257 |
| 11,984,117 B2* | 5/2024 | Hughes | G10L 15/08 |
| 2018/0012593 A1* | 1/2018 | Prasad | G10L 15/08 |
| 2019/0295544 A1* | 9/2019 | Garcia | G06F 3/167 |
| 2021/0027780 A1* | 1/2021 | Garcia | G10L 15/22 |
| 2021/0335342 A1* | 10/2021 | Yuan | G10L 15/08 |
| 2022/0148601 A1* | 5/2022 | Kracun | G10L 19/018 |
| 2023/0409277 A1* | 12/2023 | Sharifi | G10L 15/08 |

* cited by examiner

DYNAMICALLY DETERMINING WHETHER TO PERFORM CANDIDATE AUTOMATED ASSISTANT ACTION DETERMINED FROM SPOKEN UTTERANCE

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") can provide commands and/or requests to an automated assistant using spoken natural language input (i.e., utterances), which may in some cases be converted into text and then processed. An automated assistant responds to a request by providing responsive user interface output, which can include audible and/or visual user interface output. An automated assistant can additionally and/or alternatively respond to a request by controlling other computing device(s) such as smart device(s) (e.g., smart light(s), smart television(s)).

As mentioned above, many automated assistants are configured to be interacted with via spoken utterances. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives input from the user, and provides audible and/or graphical responses), and that interfaces with one or more additional components that implement the automated assistant (e.g., on-device component(s) and/or remote server device(s) that process user inputs and generate appropriate responses).

Some user interface inputs that have been used to explicitly invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be explicitly invoked in response to one or more particular spoken invocation phrases, which are also known as "hot words/phrases" or "trigger words/phrases". For example, a particular spoken invocation phrase such as "Hey Assistant," "OK Assistant", and/or "Assistant" can be spoken to invoke an automated assistant. Some automated assistants can additionally or alternatively be explicitly invoked in response to detecting, via camera(s) and/or other vision component(s) of an assistant device, that an invoking user has a maintained gaze directed toward the assistant device, is within a certain range of positions and/or orientations relative to the assistant device, and/or has provided certain touch free gesture(s).

SUMMARY

Implementations disclosed herein enable a user to bypass explicitly invoking an automated assistant, but nonetheless provide a spoken utterance that embodies an automated assistant command, and have the automated assistant cause performance of automated assistant action(s) that correspond to the assistant command. For example, implementations can enable a user to speak "what's the thermostat's set point" in the vicinity of an assistant device (i.e., a client device that implements, at least in part, the automated assistant) and, in response, the automated assistant will cause a smart thermostat's current set point to be obtained, and will provide an audible and/or visual response that conveys the current set point. This can occur responsive to the user speaking "what's the thermostat's set point", despite the user not providing any explicit invocation input(s) in association with the spoken utterance. For example, it can occur despite the user not providing any particular invocation phrase before or after the spoken utterance, not providing any input(s) to button(s) of the assistant device, not providing any touch-free invocation gesture(s) or maintained gaze directed to camera(s) of the assistant device (if any), and not providing any other explicit invocation input(s).

More particularly, in implementations disclosed herein automatic speech recognition (ASR) is performed on audio data, that is detected via microphone(s) of an assistant device (i.e., a client device that implements (at least in part) an automated assistant), to generate ASR text that predicts a spoken utterance, of a user, that is captured in the audio data. As noted above, the ASR is performed despite the user not providing any explicit invocation input(s) in association with the spoken utterance. For example, with prior explicit user approval(s), on-device ASR (i.e., ASR performed locally at the assistant device) can be performed continuously or selectively. For instance, it can occur selectively such as during certain day(s) and/or time(s), when presence of user(s) is detected, when any voice activity is detected, and/or other condition(s) are met.

Further, in those implementations the ASR text is processed and candidate automated assistant action(s) that correspond to the command, if any, are generated. For example, the ASR text can be processed, locally at the assistant device and using a local natural language understanding (NLU) engine of the assistant device, to generate the automated assistant action(s). This is also performed despite the user not providing any explicit invocation input(s) in association with the spoken utterance.

Yet further, for each of any candidate automated assistant action(s), it is determined whether to (a) cause automatic performance of the automated assistant action responsive to the spoken utterance or, instead, (b) suppress any automatic performance of the automated assistant action responsive to the spoken utterance. As described in detail herein, such determination can be made based on processing both (i) action feature(s) for the candidate automated assistant action; and (ii) environment feature(s) that each reflects a corresponding current value for a corresponding dynamic state of an environment of the assistant device. Such determination is also performed despite the user not providing any explicit invocation input(s) in association with the spoken utterance. Finally, when it is determined to (a) cause automatic performance of the automated assistant action responsive to the spoken utterance, such automatic performance is caused to be performed. The automatic performance also occurs despite the user not providing any explicit invocation input(s) in association with the spoken utterance.

Accordingly, implementations disclosed herein enable interaction of a user with an automated assistant to occur without the user needing to provide any explicit invocation input(s). This enables reduced user input to be provided by the user, which directly lessens the duration of the interaction and thereby conserves various network resources and/or remote and/or local processing resources that would otherwise be utilized in a prolonged interaction. Moreover, hot words are often unnaturally prescribed phrases that are awkward to speak and other invocation input(s) are likewise awkward to perform. This awkwardness can add friction to the user-assistant interaction and/or further prolong the interaction.

While interaction with an automated assistant, that occurs independent of explicit invocation input, achieves various technical benefits, there are drawback(s) that can result from false positive occurrences where it is incorrectly determined to (a) cause automatic performance of a candidate automated assistant action responsive to a spoken utterance and/or from false negative occurrences where it is incorrectly determined to (b) suppress any automatic performance of a candidate automated assistant action responsive to the spoken utterance.

A false positive occurrence can occur in a situation where a user provides a spoken utterance that includes a valid assistant command and corresponding assistant action(s) are automatically performed, despite the user not intending the automatic performance of the corresponding assistant action(s). For example, the user may have instead been directing the spoken utterance to another co-present user during conversation as opposed to directing the spoken utterance to the automated assistant. A false positive occurrence can additionally or alternatively result in a situation where a user provides a spoken utterance that includes a spoken command that corresponds to multiple disparate assistant action(s), and an unintended one of those actions is performed in lieu of an intended one of those actions. For example, a spoken utterance of "stock performance" can correspond to a first assistant action of rendering non-personalized stock information such as the daily performance of various stock indices, and can also correspond to a second assistant action of rendering personalized stock information such as the daily performance of the requesting user's brokerage account. The first assistant action can be automatically performed responsive to the spoken utterance, despite the second assistant action being the one intended for performance in response to the spoken utterance. With a false positive occurrence, the assistant action(s) are needlessly performed, resulting in wasteful utilization of assistant device resource(s), remote server resource(s), and/or network resource(s).

A false negative occurrence can result in a situation where a user provides a spoken utterance that includes a valid assistant command and no corresponding assistant action is automatically performed, despite the user intending the automatic performance of corresponding assistant action(s). With a false negative occurrence, user interaction with the automated assistant is prolonged and the user may need to provide additional user input (e.g., speak a hot word or provide other explicit invocation input(s)) to actually cause performance of the corresponding assistant action(s). Moreover, false negative occurrences and false positive occurrences can erode user confidence in explicit invocation input free interactions with the automated assistant, resulting in users electing to disable such capabilities and preventing technical benefits thereof from being achieved.

In view of these and other considerations, various implementations disclosed herein seek to mitigate false positive and/or false negative occurrences. In doing so, those various implementations—in determining whether to (a) cause automatic performance of a candidate automated assistant action responsive to a spoken utterance or, instead, (b) suppress any automatic performance of the candidate automated assistant action responsive to the spoken utterance—process both (i) action feature(s) for an automated assistant action; and (ii) environment feature(s). Through consideration of both action feature(s) and environment feature(s) as described herein, the accuracy of such determinations is increased, thereby mitigating false positive and/or false negative occurrences. Each of the environment features reflects a corresponding current value for a corresponding dynamic state of an environment of the assistant device. The action feature(s), for an automated assistant action, can include a confidence measure for the automated assistant action (e.g., generated by an NLU engine and that reflects confidence the automated assistant action indeed corresponds to the ASR text on which it is generated) and/or at least one semantic category for the automated assistant action (e.g., a semantic category that encompasses the intent of the action as well as other intent(s)).

As a particular example, action feature(s) for a candidate automated assistant action and environment feature(s) can each be processed, using a trained machine learning model, to generate output. A determination can be made, based on the output, as to whether to (a) cause automatic performance of the candidate automated assistant action or, instead, (b) suppress performance of the candidate automated assistant action. For example, the output can be a probability and such a determination can be based on a magnitude of the probability. For instance, it can be determined to only (a) cause automatic performance if the probability satisfies a threshold and/or is a higher probability than other candidate automated assistant action(s), if any, being considered for the same spoken utterance.

As another particular example, a human created rule can be identified based on it being indexed in association with a semantic category, which can be one of the action feature(s) for a candidate automated assistant action. Put another way, the rule can be one created for the semantic category (e.g., a first rule for a "media control action" semantic category, a second rule for a "control of an IoT device" semantic category, etc.). Further, environment feature(s) and, optionally, a confidence measure (which can be an action feature for a candidate automated assistant action) can be applied to the rule to determine whether the rule is satisfied (in which case the automated assistant action is automatically performed). As a particular example, a given rule can be indexed in association with a "media control action" semantic category and can indicate that the rule is satisfied only if one or more certain sets of conditions are present such as: (a) a confidence measure action feature is >0.6, and environment features indicate 2 or less people are present and indicate the corresponding spoken utterance is directed toward an assistant device; (b) a confidence measure action feature is >0.8, and environment features indicate 2 or less people are present and indicate the corresponding spoken utterance is directed away from an assistant device; (c) a confidence measure action feature is >0.85, and environment features indicate more than 2 people are present; and/or other set(s) of conditions.

In implementations that utilize rules, the rules can include those created by a developer of the automated assistant and deployed for use across a large population of assistant devices and/or can include those that are created and/or tailored, by a corresponding user, for assistant device(s) of the corresponding user.

In implementations that utilize a trained machine learning model, the trained machine learning model can be trained in various manners. For example, it can be trained based on training instances that each include training instance input that includes corresponding action feature(s) (of a corresponding candidate automated assistant action) and corresponding environment feature(s), and can include corresponding training instance output that is a label that indicates whether automatic performance of the candidate automated assistant action should occur in view of the environment feature(s) and action feature(s). For instance, the training instance output can be "0" if automatic performance should not occur and "1" if automatic performance should occur.

Such training instances can be generated in various manners. For example, a positive or negative training instance can be generated based on a respective supervised label assigned by a human reviewer when reviewing the environment feature(s) and action feature(s) for an assistant action (and/or text that corresponds to the assistant action). As another example, a positive training instance can be generated in a semi-supervised manner by using environment feature(s) and action feature(s) for an assistant action performed responsive to a spoken utterance that followed an explicit assistant invocation. For instance, if a user explicitly invoked the automated assistant using a hot word, then provided a spoken utterance corresponding to an automated assistant action, a positive training instance can be automatically generated using action feature(s) for the automated assistant action and environment feature(s) at a time the spoken utterance was provided. As yet another example, a positive or negative training instance can be generated based on output dictated by a human created rule in applying action feature(s) and/or environment feature(s) to the rule. Put another way, the rules can be applied to generate training instances, and those training instances used to train the machine learning model thereby enabling the machine learning model to effectively learn the rules while also being more robust than enabled by the rules.

As referenced above, each of the (ii) environment features reflects a corresponding current value for a corresponding dynamic state of an environment of the assistant device. Environment features can be generated based on processing data from assistant device(s) that detected a corresponding spoken utterance in audio data and/or data from other electronic device(s) in the same environment as the assistant device(s) that detected the corresponding spoken utterance. Various environment features can be generated such as temporal feature(s), spoken utterance origin feature(s), quantity of people feature(s), user activity feature(s), environment location feature(s), human-to-device feature(s), ambient light feature(s), and/or other environment features.

A temporal feature is indicative of one or more current temporal conditions such as a time of day, a day of the week, a month of the year, and/or other temporal condition(s). A temporal feature can be generated by an assistant device, for example, using a local clock and/or local calendar of the assistant device. As one particular example, a temporal feature can be generated that indicates a time of day with a level of discretization such as one of "morning", "afternoon", or "evening"—or one of "daylight" or "dark". As another particular example, a temporal feature can be generated that indicates a time of day with a level of discretization such as one of "weekday" or "weekend".

A spoken utterance origin feature is indicative of an origination location and/or origination direction of the spoken utterance. The origination location and/or the origination direction can optionally be relative to an assistant device that detected the corresponding spoken utterance, such as the only assistant device that detected the corresponding spoken utterance and/or the assistant device that won the assistant arbitration for the corresponding spoken utterance. The origination location can indicate a location of a user that spoke the spoken utterance, whereas an origination direction can indicate whether the user was facing toward the assistant device while speaking the spoken utterance.

A spoken utterance origin feature can be generated by an assistant device, for example, using vision data from vision component(s) (e.g., a camera) of the assistant device and/or using audio data detected by microphone(s) of the assistant device, such as audio data that corresponds to the spoken utterance. For example, image(s) from a camera can be locally processed to generate a position of a speaking user, relative to the assistant device, with a level of discretization such as "close", "medium", or "far". For instance, the size of a speaking user in the image(s) can be used to generate the position of the user. As another example, the image(s) can be locally processed to generate an origination direction of the speaking user, relative to the assistant device, with a level of discretization such as "toward" or "away". For instance, "toward" can be generated if the speaking user's face is visible in the image(s) and "away" can be generated if the speaking user's face is not visible in the image(s). As another example, the assistant device can include an array of microphones and a beamforming technique can be utilized, on audio data that corresponds to the spoken utterance, to determine a position of a speaking user, relative to the assistant device, with a level of discretization such as "close", "medium", or "far". Generally, the beamforming technique can use known distances between the microphones of the array, and temporal differences in detecting the spoken utterance audio data at the microphones of the array, to predict a position of the speaking user relative to the assistant device. As yet another example, audio data that corresponds to the spoken utterance can be processed to determine an extent of reverberation present in such audio data, and an origination direction of the speaking user, relative to the assistant device, determined based on that extent and with a level of discretization such as "toward" or "away". For instance, "toward" can be generated if the extent of reverberation is less than a threshold and "away" can be generated if the extent of reverberation is greater than the threshold. A greater extent of reverberation can indicate the speaking user is facing away from the assistant device while speaking the spoken utterance since, in such a situation, the sound from the spoken utterance will reflect off more surfaces before reaching the microphone(s) of the assistant device.

A quantity of people feature is indicative of a quantity of people in the environment of the assistant device(s) that detected the spoken utterance. The quantity of people feature can indicate an exact quantity (1, 2, 3, 4, etc.) or can be a discretization such as one of "1", "2-4", or "5 or more". In some implementations, the quantity of people feature can additionally indicate whether people in the environment are registered with/enrolled with the assistant device(s) in the environment. For example, the quantity of people feature can be a discretization such as one of "1", "more than 1 and all registered", or "more than 1 and at least one non-registered".

A quantity of people feature can be generated by an assistant device, for example, using vision data from vision component(s) (e.g., a camera) of the assistant device and/or using audio data detected by microphone(s) of the assistant device. For example, image(s) from a camera captured before (e.g., within the last 1 minute or other threshold) and/or during a spoken utterance can be processed to determine a quantity of unique people captured in the image(s).

For instance, a quantity of unique people can be determined to correspond to the quantity of unique faces that are captured in the processed images. A given captured face can be determined to be unique relative to other captured face(s) by, for example, comparing a face embedding of the captured face to embedding(s) of other captured face(s). For instance, cosine distance(s) of the face embedding to embedding(s) of other captured face(s) can be determined, and the given captured face determined to be unique if the cosine distance(s) are all greater than a threshold distance. A face embedding of a captured face can be generated by processing a portion of an image, that captures the captured face, using a face recognition machine learning model or other image encoding machine learning model. In implementations that generate a quantity of people feature that indicates whether people in the environment are registered, generated face embedding(s) for a unique face can be compared with locally stored registered embeddings, and that unique face determined to be registered, or not, based on the comparison. For example, that unique face can be determined to be registered if a cosine distance, between a face embedding for the unique face and a locally stored registered embedding, is less than a threshold distance.

As another example, audio data detected before (e.g., within the last 1 minute or other threshold) and/or during a spoken utterance can be processed to determine a quantity of unique human voices captured in the audio data. For instance, a quantity of unique people can be determined to correspond to the quantity of unique human voices that are detected based on processing the audio data. As one example, segment(s) of the audio data that contain voice activity can each be processed using a text-independent speaker identification (TISID) model or other voice encoding model to generate a corresponding voice embedding of the audio data. The corresponding voice embeddings can then be clustered based on their distances in embedding space. For instance, two or more voice embeddings can be clustered together based on those voice embeddings being close, distance-wise in embedding space, to one another—indicating that the corresponding utterances on which they are based are all from the same human speaker. Further, a given cluster can be determined to be unique relative to an additional cluster based on the embedding(s), of the given cluster and the additional cluster, being at least a threshold distance, in embedding space, apart from one another. The quantity of unique people can then be determined based on the quantity of unique clusters. In implementations that generate a quantity of people feature that indicates whether people in the environment are registered, generated voice embedding(s) for a unique voice can be compared with locally stored registered embeddings, and that unique voice determined to be registered, or not, based on the comparison. For example, that unique voice can be determined to be registered if a cosine distance, between a voice embedding for the unique face and a locally stored registered embedding, is less than a threshold distance.

In some implementations, in determining the quantity of unique human voices, a candidate human voice, detected in corresponding segment(s) of audio data, can be filtered from inclusion in the quantity of unique human voices based on determining that the segment(s) of audio data indicate that the candidate human voice originated from a speaker component of an electronic device as opposed to from a human speaker that is present in the environment. For example, if a television is on near the assistant device, a candidate human voice can be detected based on output from speaker component(s) of the television (e.g., when an actor is speaking during a television show being rendered on the television). In some of those implementations, the candidate human voice can be determined to originate from a speaker component based on analysis of frequencies of the segment(s) of audio data that correspond to speaking by the candidate human voice. For example, it can be determined to originate from a speaker component if all or a threshold percentage (e.g., 80%, 90%, or other threshold percentage) of the frequencies are all within a certain range of one another, all below a certain upper threshold, and/or are all above a certain lower threshold. For instance, it can be determined to originate from a speaker component if all or a threshold percentage are within 3,000 Hz of one another and/or are all below 3,500 Hz. These and/or other frequency analysis techniques can be utilized as frequencies generated by speaker component(s) will be more constrained and/or will otherwise objectively differ from frequencies generated by a human speaker that is actually co-present in the environment. Accordingly, in these and other manners voices from televisions and/or other non-present human speakers are not errantly included in the quantity of people feature, thereby improving the utility of the quantity of people feature in determinations disclosed herein.

A user activity feature is indicative of one or more activities in which the user is currently engaged. A user activity feature can be generated by an assistant device, for example, using local sensor data of the assistant device and/or a locally stored calendar entry of the assistant device. As one particular example, a user activity feature can be generated that indicates "preparing for dinner" based on sensing of ambient sound(s) that are indicative of preparing for dinner (e.g., pots banging, stirring, etc.). As another particular example, a user activity feature of "party" can be generated based on a calendar entry that indicates a party is currently taking place and/or based on sensing of ambient sound(s) that are indicative of a party. As another particular example, a user activity feature of "exercising" can be generated based on accelerometer and/or other sensor readings from the assistant device and/or an additional assistant device worn by a user.

An environment location feature is indicative of one or more semantic classifications of the environment. The environment location feature can optionally be generated, for example, based on location data from the assistant device and with reference to one or more databases that correlate the location data with semantic classification(s). For example, an environment location feature can be generated that indicates a semantic classification with a level of discretization such as one of "private location" or "public location", or one of "home" or "away from home"—or with a more granular level of discretization such as one of "train station", "restaurant", "shopping mall", "home", "work", etc.

A human-to-device feature indicates a physical context between a mobile battery-powered assistant device (e.g., cell phone, watch) and the user. For example, the human-to-device feature can indicate whether a cell phone assistant device is "in a pocket of the user", "being held by the user but at a distance", "being held by the user close to the user's face", or "is placed on a surface".

Various example environment features and corresponding example discretizations thereof have been described in detail above. However, additional or alternative environment features and/or discretizations can be utilized in various implementations disclosed herein.

It is noted that various implementations disclosed herein may serve to reduce the time required to obtain responses/ fulfillment from an automated assistant. This is not least because such implementations may obviate the need for the user to provide an explicit invocation to the automated assistant, such as by saying a hot-word/phrase or performing a specific user input, prior to speaking a command or query. In addition, in certain implementations, the automated assistant may receive, understand and, in some instances, respond to/fulfill the command or query without communicating with a server, thereby further reducing the time in which a response/fulfillment can be provided.

Implementations disclosed herein are directed to and/or can be used in combination with assistant devices that include at least one or more microphones and an automated assistant application. The automated assistant application can be installed "on-top of" an operating system of the assistant device and/or can itself form part of (or the entirety of) the operating system of the assistant device. The automated assistant application includes, and/or has access to, on-device ASR, on-device NLU, and/or on-device fulfillment. For example, on-device ASR can be performed using an on-device speech recognition module that processes audio data (detected by the microphone(s)) using an end-to-end speech recognition machine learning model stored locally at the assistant device. The on-device ASR generates recognized ASR text for a spoken utterance (if any) present in the audio data. Also, for example, on-device natural language understanding (NLU) can be performed using an on-device NLU module that processes recognized ASR text, generated using the on-device speech recognition, and optionally contextual data, to generate NLU data. NLU data can include intent(s) that correspond to the spoken utterance and optionally parameter(s) (e.g., slot values) for the intent(s). NLU data can also optionally include a corresponding confidence value, for each of the intent(s) (and optional slot values) that reflects a likelihood (as determined by the NLU module) that the intent(s) (and optional slot values) are intended by corresponding ASR text. On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote ASR, remote NLU, and/or remote fulfillment can at least selectively be utilized. For example, recognized ASR text can at least selectively be transmitted to remote automated assistant component(s) for remote NLU and/or remote fulfillment. For instance, the recognized ASR text can optionally be transmitted for remote performance in parallel with on-device performance, or responsive to failure of on-device NLU and/or on-device fulfillment. However, on-device ASR, on-device NLU, on-device fulfillment, and/or on-device execution can optionally be prioritized at least due to the data security improvement and/or latency reductions they provide when resolving a spoken utterance (due to no client-server roundtrip(s) being needed to resolve the spoken utterance). Further, on-device functionality can be the only functionality that is available in situations with no or limited network connectivity.

The above description is provided as an overview of some implementations of the present disclosure. Further description of those implementations, and other implementations, are described in more detail below.

Some implementations disclosed herein include one or more computing devices that include one or more processors such as central processing unit(s) (CPU(s)), graphics processing unit(s) (GPU(s)), digital signal processor(s) (DSP(s)), and/or tensor processing unit(s) (TPU(s)). One or more of the processors are operable to execute instructions stored in associated memory, and the instructions are configured to cause performance of any of the methods described herein. The computing devices can include, for example, client assistant devices with microphone(s), at least one display, and/or other sensor component(s). Some implementations also include one or more non-transitory computer readable storage media storing computer instructions executable by one or more processors to perform any of the methods described herein.

DETAILED DESCRIPTION

Figure 1:
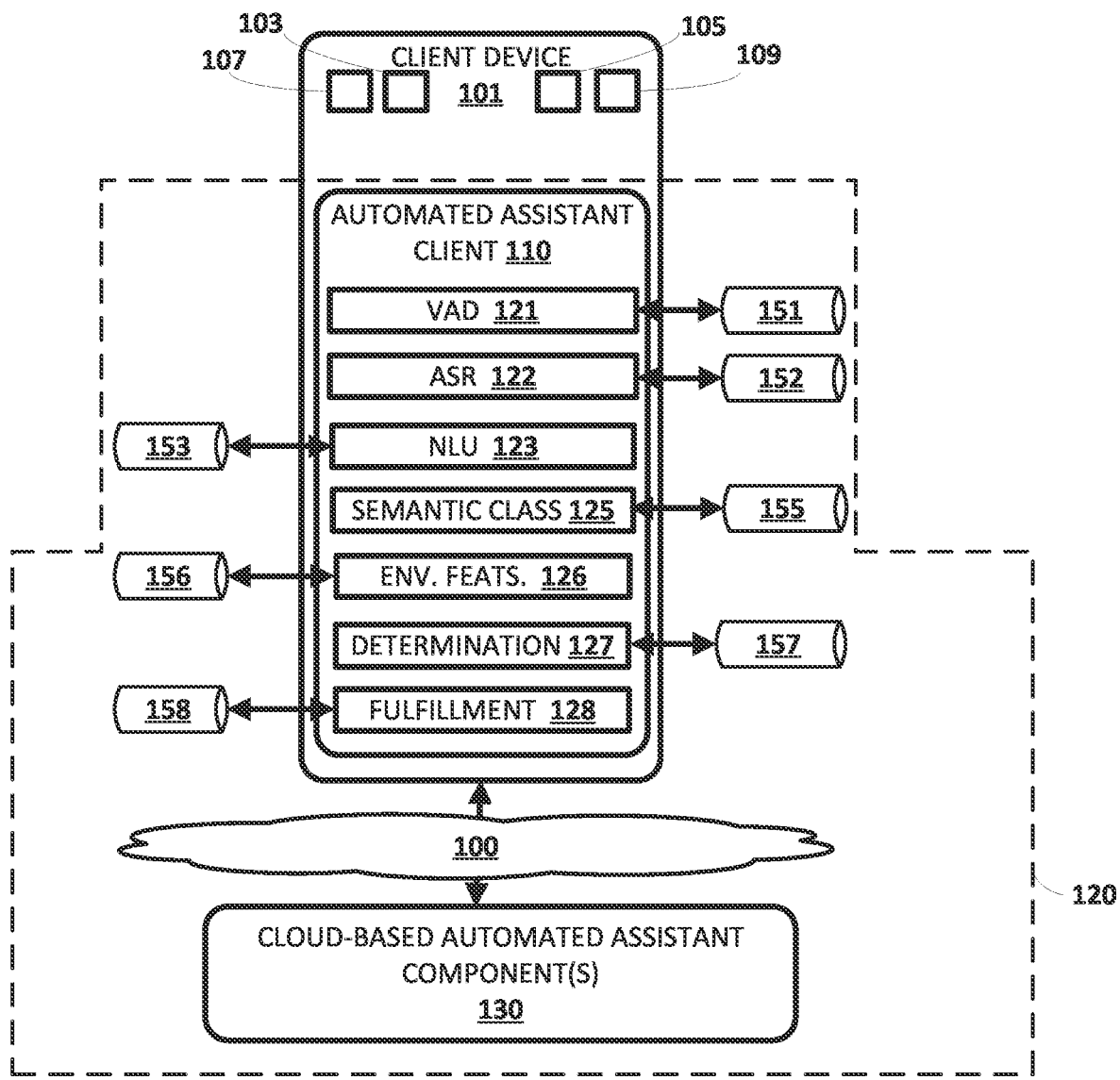
FIG. 1 is a block diagram of an example environment in which implementations disclosed herein may be implemented.

FIG. 1 illustrates an example environment in which techniques disclosed herein can be implemented. The example environment includes a client device 101 that at least selectively executes an automated assistant client 110. The term "assistant device" is also used herein to reference a client device 101 that at least selectively executes an automated assistant client 110. One or more cloud-based automated assistant components 130 can be implemented on one or more computing systems (collectively referred to as a "cloud" computing system) that are communicatively coupled to client device 101 via one or more local and/or wide area networks (e.g., the Internet) indicated generally at 100. The cloud-based automated assistant components 130 can be implemented, for example, via a cluster of high-performance servers.

In various implementations, an instance of an automated assistant client 110, by way of its interactions with one or more cloud-based automated assistant components 130, may form what appears to be, from a user's perspective, a logical instance of an automated assistant 120 with which the user may engage in a human-to-computer interactions (e.g., spoken interactions). One instance of such an automated assistant 120 is depicted in FIG. 1 in dashed line. In some implementations and/or in some human-to-computer interactions, the automated assistant client 110 can perform some or all automated assistant actions locally, without any interaction with cloud-based automated assistant components 130.

The client device 101 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. As noted previously, client device 101 can optionally take the form of an assistant device primarily designed to facilitate interactions between users and automated assistant 120 (e.g., a standalone interactive device with speaker(s), microphone(s), camera (and/or other vision component(s)), and a display).

Client device 101 can be equipped with one or more vision components 107 having one or more fields of view. Vision component(s) 107 can take various forms, such as monographic cameras, stereographic cameras, a LIDAR component, a radar component, etc. The one or more vision components 107 may be used to capture vision frames (e.g., image frames (still images or video)) of an environment in which client device 101 is deployed. Client device 101 can also be equipped with one or more microphones 109.

Client device 101 can also include one or more presence sensors 105 and/or one or more displays 103 (e.g., a touch-sensitive display). Display(s) 103 can be one of the user interface output component(s) through which user interface output is rendered in various implementations. Display(s) 103 can further be one of the user interface output component(s) through which visual portion(s) of a response, from automated assistant client 110, are rendered. The client device 101 can also include one or more speaker component(s) (not illustrated) via which audible portion(s) of a response, from automated assistant client 110, are rendered. Presence sensor(s) 105 can include, for example, a PIR and/or other passive presence sensor(s).

The automated assistant client 110 is illustrated as including an on-device VAD engine, an on-device ASR engine 122, on-device NLU engine 123, on-device semantic classification engine 125, an on-device environment features engine 126, an on-device determination engine 127, and an on-device fulfillment engine 128. In various implementations the automated assistant client 110 can include additional engine(s) that are not illustrated or described herein for purposes of brevity. Further, in some additional or alternative implementations, one or more on-device engine(s) may be omitted, such as on-device VAD engine 121.

VAD engine 121 can at least selectively process audio data, captured via microphone(s) 109, to detect whether the processed audio data includes voice activity. For example, VAD engine 121 can process audio data, using VAD model 151, to generate output that indicates a probability that voice activity is captured in the processed audio data. If the probability satisfies a threshold, the VAD engine 121 can determine voice activity is included in the processed audio data.

On-device ASR engine 122 processes audio data, captured via microphone(s) 109, to generate ASR text that is a predicted textual recognition of any spoken utterance included in the audio data. In generating the ASR text, the on-device ASR engine 122 can process the audio data using one or more on-device ASR models 152. An on-device ASR model can be a neural network model, such as a transformer model or other neural network model that enables real-time streaming generation of ASR text.

As described herein, the on-device ASR engine 122 can at least selectively process audio data, captured via microphone(s) 109, independent of any explicit user invocation of the automated assistant client 110. For example, the on-device ASR engine 122 can continuously process audio data captured via microphone(s) 109. As another example, the on-device ASR engine 122 can process audio data in response to presence sensor(s) 105 and/or vision component(s) 107 indicating one or more humans are present near the client device 101. For instance, the on-device ASR engine 122 can process audio data in response to human presence being detected anytime within the last thirty seconds or other threshold period of time. As another example, the on-device ASR engine 122 can process audio data in response to VAD engine 121 indicating presence of voice activity. For instance, if VAD engine 121 detects presence of voice activity, buffered audio data in which the voice activity was detected can be provided to on-device ASR engine 122 for processing, along with following streamlining audio data for at least an amount of time thereafter.

The on-device NLU engine 123 processes ASR text, generated by the on-device ASR engine 122, to generate candidate automated assistant action(s) that corresponds to the ASR text and, optionally, a corresponding confidence measure for each of the automated assistant action(s). In generating the candidate automated assistant action(s) and/or the confidence measure(s), the on-device NLU engine 123 can utilize one or more NLU models 153. The NLU model(s) 153 can include machine learning model(s) that can be used to process text and generate predicted intent(s) and/or, optionally, parameter(s) (e.g., slot values) for the intent(s), that correspond to the text. An intent and optional parameter(s) can collectively define a candidate automated assistant action. The NLU model(s) 153 can additionally or alternatively include a grammar that includes mappings between text phrases (and/or regular expressions or other representations of corresponding text phrases) and automated assistant action(s) that correspond thereto. For example, "what's on my calendar" can be mapped, in the grammar, to an assistant action of "render calendar entries for today's date". The mappings in the grammar can also be stored in association with confidence measures that each reflect confidence that the corresponding assistant action is the correct action for the corresponding text phrase (and/or regular expression) of the mapping.

The on-device semantic classification engine 125 selects, for each of the candidate automated assistant action(s) generated by the NLU engine 123, at least one corresponding semantic category. For a given candidate automated assistant action, the NLU engine 123 can select, from a superset of candidate semantic categories, a subset of semantic categories. In some implementations, the candidate semantic categories of the superset include or are restricted to genus categories that each encompass a plurality of disparate intents. For example, a "control of IoT device" semantic category can encompass a plurality of disparate more granular intents such as "turn on", "turn off", "dim", "adjust", etc. As another example, a "render potentially sensitive content" semantic category can encompass a plurality of disparate intents such as "render email", "render calendar entry", "place call", etc. In selecting at least one semantic category for a candidate assistant action, the on-device semantic classification engine 125 can utilize semantic model(s) 152. The semantic model(s) 155 can include, for example, mappings between intents and corresponding semantic categories. For instance, each of multiple granular IoT device control intents can be mapped to a "control of IoT device" semantic category. The semantic model(s) 155 can additionally or alternatively include a machine learning classifier that can be used to process an intent and/or parameter(s) of a candidate automated assistant action, and generate output that indicates the semantic category or categories that should be selected for the candidate automated assistant action.

The on-device environment features engine 126 generates environment features based on processing data from client device 101 and/or from other device(s) in network communication with client device 101 and in the same environment with the client device 101. The on-device environment features engine 126 can generate various such as temporal feature(s), spoken utterance origin feature(s), quantity of people feature(s), user activity feature(s), environment location feature(s), human-to-device feature(s), ambient light feature(s), and/or other environment features. In some implementations, the on-device environment features engine 126 generates updated environment features at regular or irregular intervals. In some implementations, the on-device environment features engine 126 generates updated environment features in response to ASR engine 122 generating recognized ASR text and/or NLU engine 123 generating candidate automated assistant action(s).

In generating environment feature(s), the on-device environment features engine 126 can utilize environment feature(s) model(s) 156. For example, the environment feature(s) model(s) 156 can include a TISID model described herein and the TISID model can be used by the on-device environment features engine 126 in generating the quantity of people feature(s). As another example, the model(s) 156 can include model(s) that can process sensor data, from sensor(s) of client device 101, to predict a user activity, and such model(s) can be used by the on-device environment features engine 126 in generating user activity feature(s).

The on-device determination engine 127 determines, for each candidate automated assistant action determined by the on-device NLU engine 123 for ASR text of a spoken utterance, whether to (a) cause automatic performance of the candidate automated assistant action responsive to the spoken utterance or, instead, (b) suppress any automatic performance of the candidate automated assistant action responsive to the spoken utterance. The on-device determination engine 127 makes such a determination based on both (i) action feature(s) for the automated assistant action (e.g., a confidence measure determined by on-device NLU engine 123 and/or at least one semantic category determined by on-device semantic classification engine 125) and (ii) environment feature(s) determined by on-device environment features engine 126. Further, in making the determination, the on-device determination engine 127 can utilize one or more determination models 157. For example, the determination model(s) 157 can include a trained machine learning model and action feature(s) for the candidate automated assistant action and environment feature(s) can each be processed, using the trained machine learning model, to generate output, and the determination made based on the output. As another example, the determination model(s) can additionally or alternatively include rule(s), and the action feature(s) for the candidate automated assistant action and environment feature(s) can be applied to the rule in making the determination.

The on-device fulfillment engine 128 can be used to cause automatic performance of a candidate automated assistant action when the on-device determination engine 127 determines to cause automatic performance of the candidate automated assistant action. For example, the on-device fulfillment engine 128 can initiate on-device and/or remote performance of the candidate automated assistant action. For instance, when the candidate automated assistant action is control of an IoT device, the on-device fulfillment engine 128 can transmit corresponding control command(s) directly to the IoT device over a local network or transmit command(s) to a remote server that will then transmit corresponding control command(s) to the IoT device. Also, for instance, the on-device fulfillment engine 128 can interface with the cloud-based automated assistant component(s) 130 in obtaining a response to the candidate automated assistant action, then cause audible and/or visual rendering of the response.

Cloud-based automated assistant components 130 can include one or more engines that complement any on-device engine counterparts of automated assistant client 110 and/or that are provided in lieu of any local engine counterparts. For example, cloud-based automated assistant components can include cloud-based ASR, NLU, and/or fulfillment engines. For instance, cloud-based automated assistant components 130 can include a cloud-based fulfillment engine that can be utilized in lieu of on-device fulfillment engine 128, or utilized when on-device fulfillment engine 128 is unable to locally fulfill an automated assistant action. Also, for instance, cloud-based automated assistant components 130 can include a cloud-based NLU engine that can be utilized in lieu of on-device NLU engine 123, or utilized when on-device NLU engine 123 is unable to locally generate any candidate automated assistant action based on ASR text.

FIGS. 2A, 2B, 2C, and 2D each depicts an example process flow that demonstrates various aspects of the present disclosure, in accordance with various implementations.

Figure 2A:
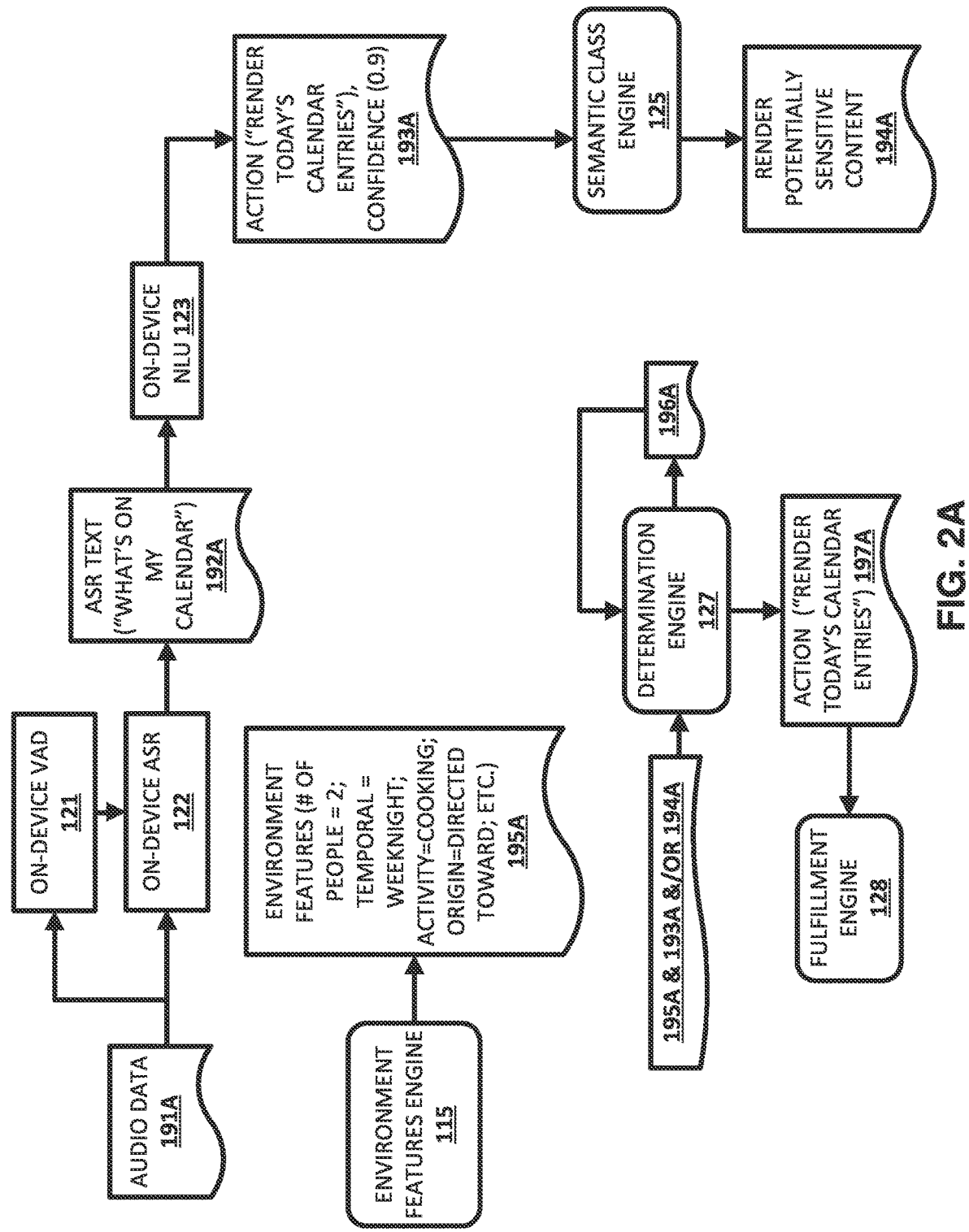
FIG. 2A, FIG. 2B, FIG. 2C, and FIG. 2D each depicts an example process flow that demonstrates various aspects of the present disclosure, in accordance with various implementations.

Turning initially to FIG. 2A, audio data 191A is detected via microphone(s) 109 of client device 101 and processed by on-device ASR engine 122, optionally in response to VAD engine 121 processing the audio data and determining that the audio data includes voice activity. The audio data 191A captures the spoken utterance "what's on my calendar". The on-device ASR engine 122 processes the audio data 191A to generate ASR text 192A of "what's on my calendar".

The on-device NLU engine 123 processes the ASR text 192A to generate a single candidate automated assistant action 193A of "render today's calendar entries", along with a confidence measure of 0.9. The on-device semantic classification engine 125 processes the candidate automated assistant action 193A to generate a semantic category 194A of "render potentially sensitive content".

On-device environment features engine 115 also generates current environment features 195A, which include a quantity of people feature of "2", a temporal feature of "weeknight", a user activity feature of "cooking", and a spoken utterance origin feature of "directed toward".

On-device determination engine 127 processes the environment features 195A and the confidence measure (0.9) of the candidate automated assistant action 193A and/or the semantic category 194A, to generate output(s) 196A. The on-device determination engine 127 performs the processing using, for example, machine learning model(s) and/or rule(s) as described herein.

The on-device determination engine 127 determines, based on the output(s) 196A, to cause automatic performance of the candidate automated assistant action 193A. For example, the output(s) 196A can indicate a rule is satisfied and/or that machine learning output satisfies a threshold. As a result, the on-device determination engine 127 provides a command 197A, to the fulfillment engine 128, to cause the fulfillment engine 128 to automatically cause performance of the candidate automated assistant action 193A.

Figure 2B:
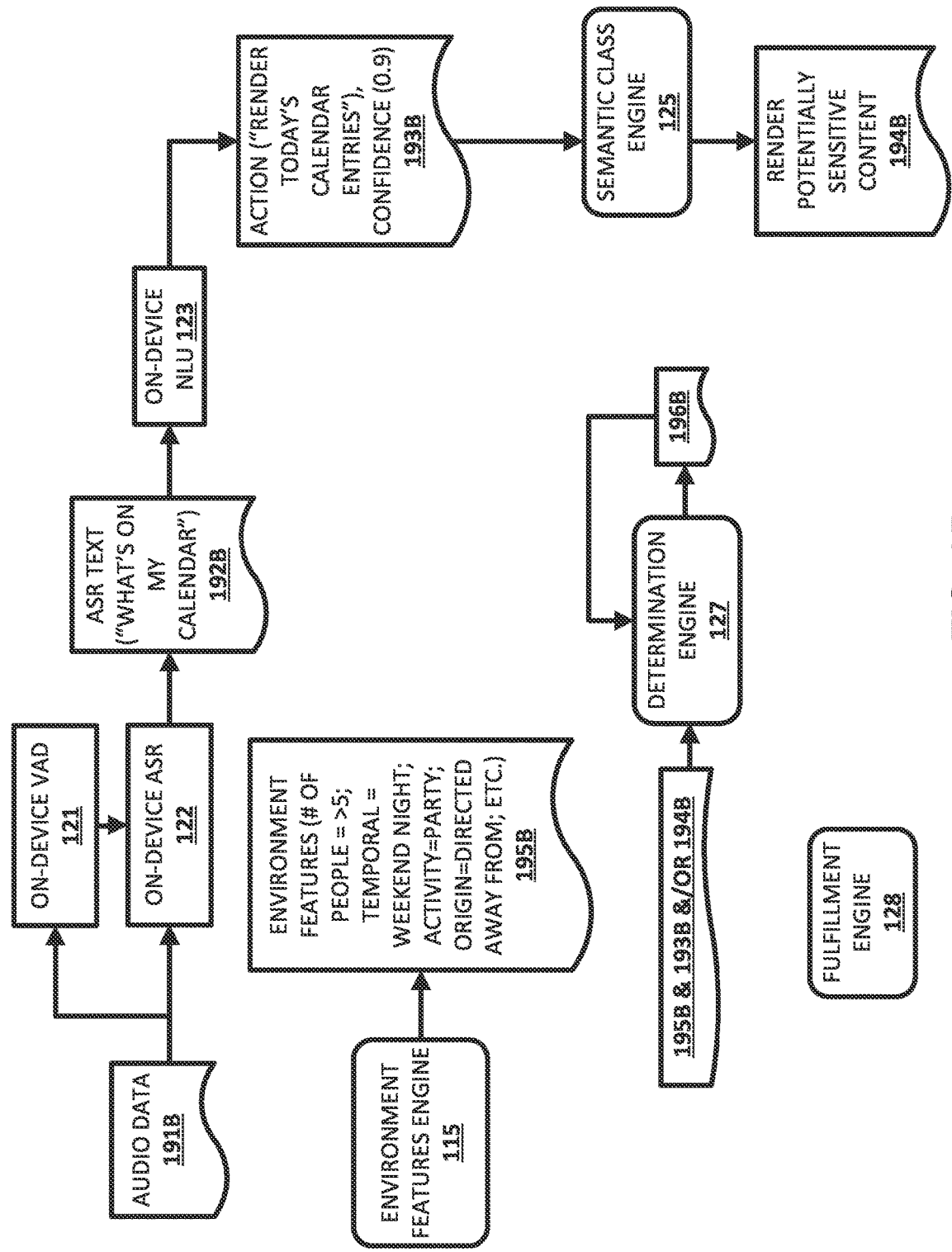

Turning now to FIG. 2B, audio data 191B is detected via microphone(s) 109 of client device 101 and processed by on-device ASR engine 122, optionally in response to VAD engine 121 processing the audio data and determining that the audio data includes voice activity. The audio data 191B captures the spoken utterance "what's on my calendar", which is the same as the spoken utterance of FIG. 2A. The on-device ASR engine 122 processes the audio data 191B to generate ASR text 192B of "what's on my calendar", which is the same as the ASR text 192A of FIG. 2A.

The on-device NLU engine 123 processes the ASR text 192B to generate a single candidate automated assistant action 193B of "render today's calendar entries", along with a confidence measure of 0.9, which is the same as the candidate automated assistant action 193A of FIG. 2A. The on-device semantic classification engine 125 processes the candidate automated assistant action 193B to generate a semantic category 194B of "render potentially sensitive content", which is the same as the semantic category 194A of FIG. 2A.

On-device environment features engine 115 also generates current environment features 195B, which do differ from environment features 195A of FIG. 2A. For example, environment features 195B include a quantity of people feature of ">5", a temporal feature of "weekend night", a user activity feature of "party", and a spoken utterance origin feature of "directed away from". Again, the values for those features, in environment features 195B, differ from their counterparts in environment features 195A of FIG. 2A.

On-device determination engine 127 processes the environment features 195B and the confidence measure (0.9) of the candidate automated assistant action 193B and/or the semantic category 194B, to generate output(s) 196B, which differ from the output(s) 196A of FIG. 2A. The on-device determination engine 127 performs the processing using, for example, machine learning model(s) and/or rule(s) as described herein.

The on-device determination engine 127 determines, based on the output(s) 196B, to suppress automatic performance of the candidate automated assistant action 193B. For example, the output(s) 196B can indicate no rule is satisfied and/or that machine learning output fails to satisfy a threshold. As a result, the on-device determination engine 127 does not provide any command to the fulfillment engine 128 and, rather, no further action is taken in response to the spoken utterance captured in the audio data 191B.

Accordingly, FIGS. 2A and 2B collectively illustrate that the action corresponding to a spoken utterance of "what's on my calendar" will be automatically performed in some environmental conditions, but not in other environmental conditions.

Figure 2C:
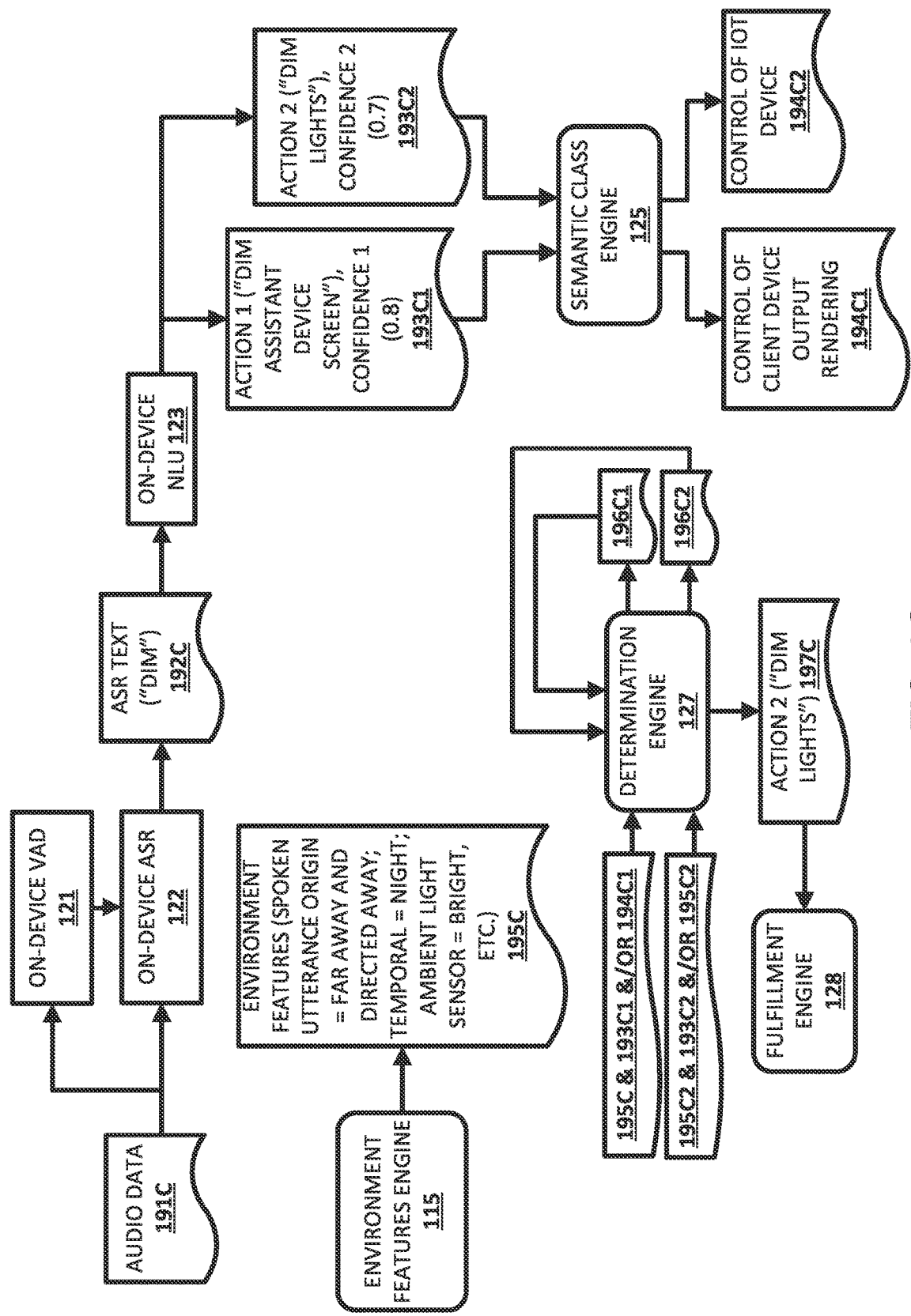

Turning now to FIG. 2C, audio data 191C is detected via microphone(s) 109 of client device 101 and processed by on-device ASR engine 122, optionally in response to VAD engine 121 processing the audio data and determining that the audio data includes voice activity. The audio data 191C captures the spoken utterance "dim". The on-device ASR engine 122 processes the audio data 191C to generate ASR text 192C of "dim".

The on-device NLU engine 123 processes the ASR text 192C to generate two candidate automated assistant actions and corresponding confidence measures. Namely: a first candidate action 193C1 of "dim assistant device screen", along with a confidence measure of 0.8; and a second candidate action 193C2 of "dim lights", along with a confidence measure of 0.9. The on-device semantic classification engine 125 processes the candidate automated assistant action 193C1 to generate a semantic category 194C1 of "control of client device output rendering". The on-device semantic classification engine 125 also processes the candidate automated assistant action 193C2 to generate a semantic category 194C2 of "control of IoT device".

On-device environment features engine 115 also generates current environment features 195C, which include spoken utterance origin features of "far away" and "directed away", a temporal feature of "night", and an ambient light sensor feature of "bright".

On-device determination engine 127 processes the environment features 195C and the confidence measure (0.8) of the first candidate automated assistant action 193C1 and/or the semantic category 194C1, to generate output(s) 196C1. The on-device determination engine 127 also processes the environment features 195C and the confidence measure (0.7) of the second candidate automated assistant action 193C2 and/or the semantic category 194C2, to generate output(s) 196C2. The on-device determination engine 127 performs the processing using, for example, machine learning model(s) and/or rule(s) as described herein.

The on-device determination engine 127 determines, based on the output(s) 196C1 and 196C2, to cause automatic performance of the first candidate automated assistant action 193C1, and to suppress automatic performance of the second candidate automated assistant action 193C2. For example, the output(s) 196C1 can indicate a rule is satisfied and/or that machine learning output satisfies a threshold—whereas the output(s) 196C2 can fail to indicate any rule is satisfied and/or that machine learning output satisfied a threshold. For instance, machine learning output, in output(s) 196C1, can indicate a higher probability than machine learning output in output(s) 196C2. As a result, the on-device determination engine 127 provides a command 197C, to the fulfillment engine 128, to cause the fulfillment engine 128 to automatically cause performance of the first candidate automated assistant action 193C1.

Figure 2D:
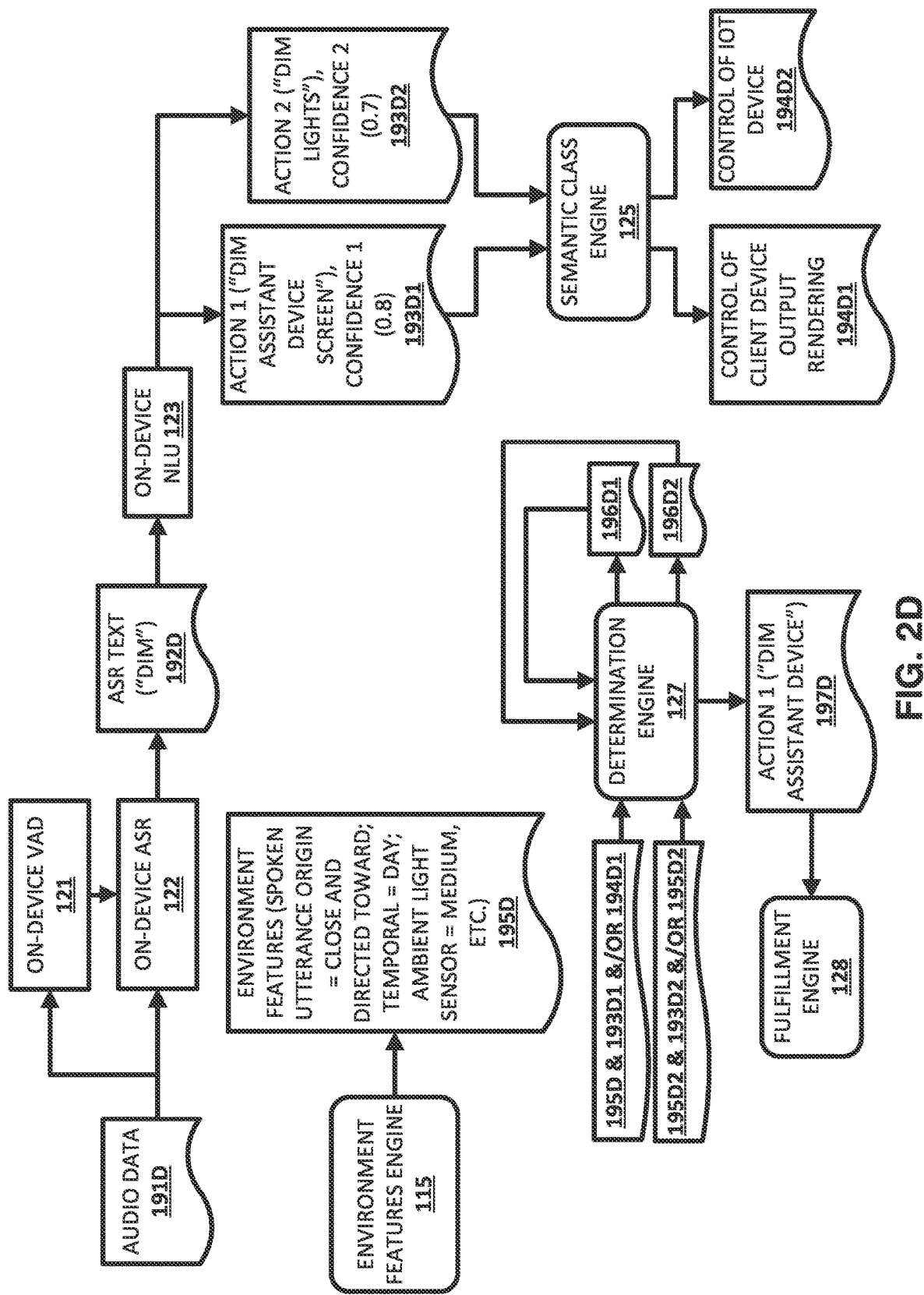

Turning now to FIG. 2D, audio data 191D is detected via microphone(s) 109 of client device 101 and processed by on-device ASR engine 122, optionally in response to VAD engine 121 processing the audio data and determining that the audio data includes voice activity. The audio data 191D captures the spoken utterance "dim", which is the same as the spoken utterance of FIG. 2C. The on-device ASR engine 122 processes the audio data 191D to generate ASR text 192D of "dim", which is the same as ASR text 192C of FIG. 2C.

The on-device NLU engine 123 processes the ASR text 192D to generate two candidate automated assistant actions and corresponding confidence measures. Namely: a first candidate action 193D1 of "dim assistant device screen", along with a confidence measure of 0.8; and a second candidate action 193D2 of "dim lights", along with a confidence measure of 0.9. First and second candidate actions

193D1 and 193D2, and the corresponding confidence measures, are the same as their counterparts (193C1 and 193C2) in FIG. 2C.

The on-device semantic classification engine 125 processes the candidate automated assistant action 193D1 to generate a semantic category 194D1 of "control of client device output rendering", which is the same as semantic category 194C1 of FIG. 2C. The on-device semantic classification engine 125 also processes the candidate automated assistant action 193D2 to generate a semantic category 194D2 of "control of IoT device", which is the same as semantic category 194C2 of FIG. 2C.

On-device environment features engine 115 also generates current environment features 195D, which do differ from environment features 195C of FIG. 2C. Environment features 195D include spoken utterance origin features of "close" and "directed toward", a temporal feature of "day", and an ambient light sensor feature of "medium". Again, the values for those features, in environment features 195D, differ from their counterparts in environment features 195C of FIG. 2C.

On-device determination engine 127 processes the environment features 195D and the confidence measure (0.8) of the first candidate automated assistant action 193D1 and/or the semantic category 194D1, to generate output(s) 196D1. The on-device determination engine 127 also processes the environment features 195D and the confidence measure (0.7) of the second candidate automated assistant action 193D2 and/or the semantic category 194D2, to generate output(s) 196D2. The on-device determination engine 127 performs the processing using, for example, machine learning model(s) and/or rule(s) as described herein.

The on-device determination engine 127 determines, based on the output(s) 196D1 and 196D2, to cause automatic performance of the second candidate automated assistant action 193D2, and to suppress performance of the first candidate automated assistant action 193D1. For example, the output(s) 196D2 can indicate a rule is satisfied and/or that machine learning output satisfies a threshold—whereas the output(s) 196D1 can fail to indicate any rule is satisfied and/or that machine learning output satisfied a threshold. For instance, machine learning output, in output(s) 196D2, can indicate a higher probability than machine learning output in output(s) 196D1. As a result, the on-device determination engine 127 provides a command 197D, to the fulfillment engine 128, to cause the fulfillment engine 128 to automatically cause performance of the second candidate automated assistant action 193D1.

Accordingly, FIGS. 2C and 2D collectively illustrate that a first action corresponding to a spoken utterance of "dim" will be automatically performed in some environmental conditions, while a second action corresponding to "dim" will be suppressed while, in other environmental conditions the second action will be automatically performed while the first action is suppressed. Although not illustrated, it is noted that there can be other environmental conditions when both the first action and the second action will be suppressed and no automatic performance of any action responsive to the spoken utterance of "dim". For example, when those environmental conditions are present the outputs generated by the determination engine 127, for each of the first action and the second action, can fail to indicate any rule is satisfied and/or fail to indicate that machine learning output satisfies a threshold.

Figure 3:
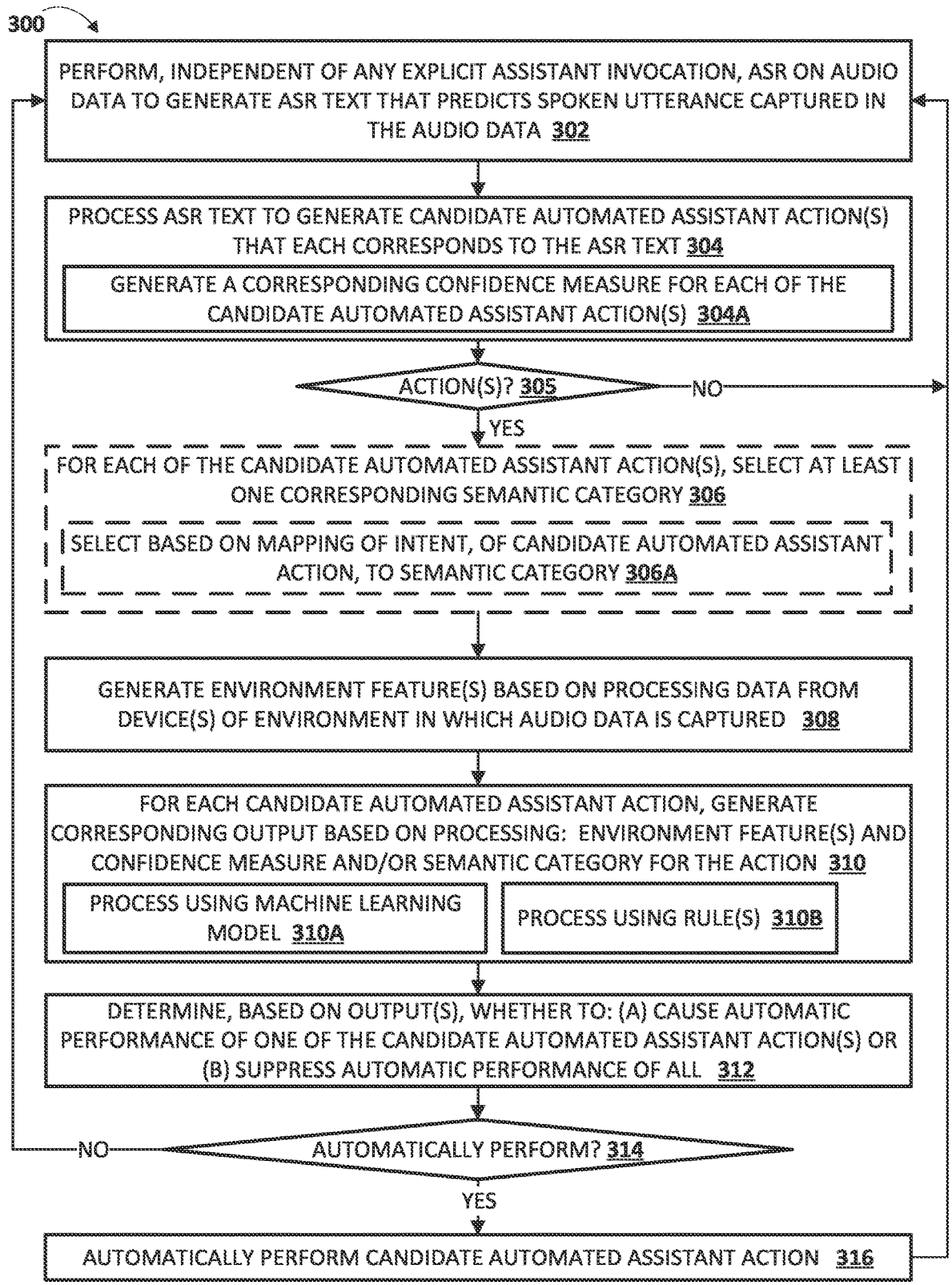
FIG. 3 depicts a flowchart illustrating an example method according to implementations disclosed herein.

FIG. 3 depicts a flowchart illustrating an example method 300 according to implementations disclosed herein. For convenience, the operations of the method 300 are described with reference to a system that performs the operations. This system may include various components of various computer systems, such as one or more components of a client device (e.g., the client device 101 of FIG. 1). Moreover, while operations of the method 300 are shown in a particular order, this is not meant to be limiting. One or more operations may be reordered, omitted or added.

At block 302, the system performs, independent of any explicit assistant invocation, ASR on audio data to generate ASR text that predicts a spoken utterance captured in the audio data. For example, the audio data can be detected via microphones of an assistant device and can be processed, by an on-device ASR engine of the assistant device, to generate ASR text.

At block 304, the system processes the ASR text (from block 302) to generate candidate automated assistant action(s) that each corresponds to the ASR text. For example, the system can process the ASR text, using an on-device NLU engine, to generate one or multiple candidate automated assistant action(s) that each correspond to the ASR text. The system can leverage one or more grammars and/or one or more machine learning models in generating the candidate automated assistant action(s). It is noted that, for some ASR text, the system will be unable to generate any candidate automated assistant action(s) that correspond to the ASR text. Those situations are addressed in block 305 below.

Block 304 optionally includes sub-block 304A, where the system generates a corresponding confidence measure for each of the candidate automated assistant action(s). For example, the NLU engine can generate a confidence measure for each of the candidate automated assistant action(s). For instance, when a machine learning model is utilized to process the ASR text and predict a candidate automated assistant action, it can also generate a confidence measure for that prediction, and that confidence measure used for the candidate automated assistant action. Also, for instance, when a mapping of a grammar is utilized to process the ASR text and predict a candidate automated assistant action, the mapping can have an associated confidence measure stored therewith, and that confidence measure used for the candidate automated assistant action.

At block 305, the system determines whether any candidate automated assistant actions were generated at block 304. If so, the system proceeds to block 306. If not, the system proceeds back to block 302 to perform ASR on further audio data that captures a spoken utterance. For example, if the ASR text was the single word "patent", there may be no candidate automated assistant action determined for that ASR text at block 304. As a result, at block 305 the system can decide to proceed back to block 302.

At optional block 306, the system, for each of the candidate automated assistant action(s) determined at block 304, selects at least one corresponding semantic category for the automated assistant action. The at least one corresponding semantic category selected for a candidate automated assistant action can be a subset of candidate semantic categories. Further, the at least one corresponding semantic category can optionally be a genus category that encompasses a plurality of disparate intents, including an intent of the candidate automated assistant action.

Optional block 306 optionally includes sub-block 306A, in which the system selects a semantic category, for a candidate automated assistant action, based on a mapping of an intent, of the candidate automated assistant action, to the semantic category. For example, the semantic category can be mapped to multiple intents, including the intent of the candidate automated assistant action.

Figure 4:
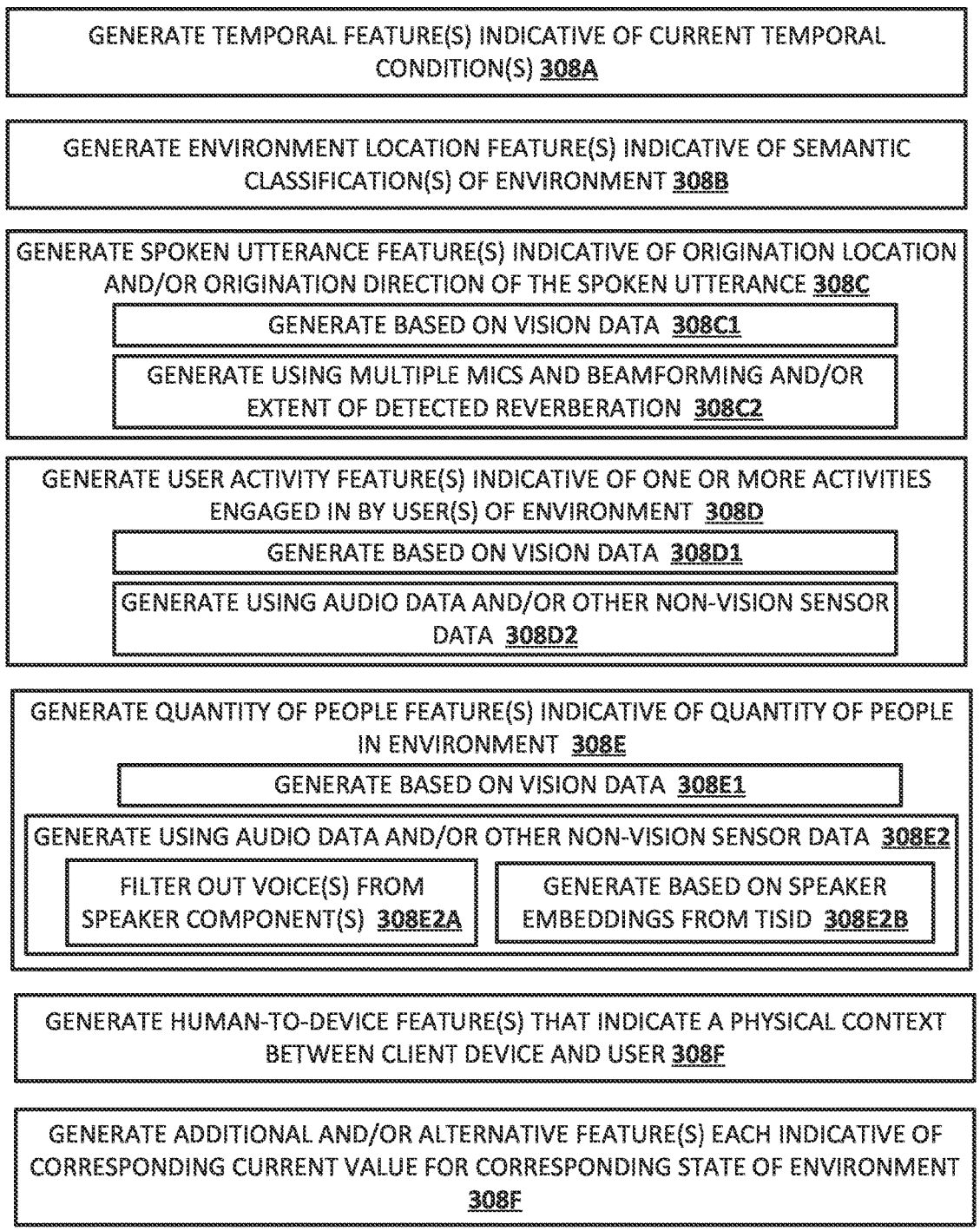
FIG. 4 depicts an example of optional sub-blocks of block 308 of FIG. 3.

At block 308, the system generates environment feature(s) based on processing data from device(s) of the environment in which the audio data, of block 302, was captured. For example, the data can be from at least the device via which the audio data of block 302 was captured. The environment feature(s) each reflects a corresponding current value for a corresponding dynamic state of the environment. Various environment features can be generated such as temporal feature(s), spoken utterance origin feature(s), quantity of people feature(s), user activity feature(s), environment location feature(s), human-to-device feature(s), ambient light feature(s), and/or other environment features. In some implementations, block 308 includes one or more of sub-blocks 308A-F, which are illustrated in FIG. 4 and described in more detail below.

At block 310, the system, for each of the candidate automated assistant action(s) determined at block 304, generates corresponding output based on processing: the environment features generated in block 308 and the confidence measure for the action (optionally generated in sub-block 304A) and/or the at least one semantic category for the action (optionally generated in block 306). In some implementations, block 310 includes sub-block 310A and/or sub-block 310B.

At sub-block 310A the system, in generating the output for a candidate automated assistant action, processes the environment features and the action features using a trained machine learning model. For example, the system can process the environment and action features using the trained machine learning model to generate output that indicates a probability. The trained machine learning model can be trained in various manners. For example, it can be trained based on training instances that each include training instance input that includes corresponding action feature(s) (of a corresponding candidate automated assistant action) and corresponding environment feature(s), and can include corresponding training instance output that is a label that indicates whether automatic performance of the candidate automated assistant action should occur in view of the environment feature(s) and action feature(s). For instance, the training instance output can be "0" if automatic performance should not occur and "1" if automatic performance should occur. Such training instances can be generated in various manners. For example, a positive or negative training instance can be generated based on a respective supervised label assigned by a human reviewer when reviewing the environment feature(s) and action feature(s) for an assistant action (and/or text that corresponds to the assistant action). As another example, a positive training instance can be generated in a semi-supervised manner by using environment feature(s) and action feature(s) for an assistant action performed responsive to a spoken utterance that followed an explicit assistant invocation. As yet another example, a positive or negative training instance can be generated based on output dictated by a human created rule in applying action feature(s) and/or environment feature(s) to the rule.

At sub-block 3108 the system, in generating the output for a candidate automated assistant action, processes the environment features and the action features using one or more rules. For example, the system can process the environment and action features using the rule(s) to generate output that indicates whether any of the rule(s) is satisfied. For instance, a human created rule can be identified based on it being indexed in association with the semantic category, for a candidate automated assistant action, generated in optional block 306. Further, environment feature(s), generated at block 308, and a confidence measure, for the candidate automated assistant action, generated in optional sub-block 304A, can be applied to the rule. As a particular example, a given rule can be indexed in association with a "obtain general information" semantic category and can indicate that the rule is satisfied only if one or more certain sets of conditions are present such as: (a) a confidence measure action feature is >0.9, and environment features indicate 2 or more people are present and indicate the corresponding spoken utterance is directed toward an assistant device; and (b) a confidence measure action feature is >0.8, and environment features indicate only 1 person is present; and/or other set(s) of conditions.

At block 312, the system determines, based on the output(s) of block 310, whether to (a) cause automatic performance of one of the candidate automated assistant action(s) or (b) suppress automatic performance of all of the candidate automated assistant action(s). For example, the system can determine to suppress if machine learning output(s) for all of the candidate automated assistant action(s) fail to satisfy a threshold and/or if rule output(s) for all of the candidate automated assistant action(s) fail to indicate satisfaction of the rule. As another example, if there is only a single candidate automated assistant action whose ML output satisfies a threshold and/or that satisfies a rule, it can be determined to cause automatic performance of that single candidate automated assistant action. As yet another example, if there are multiple candidate automated assistant actions whose ML output satisfies a threshold, it can be determined to cause automatic performance of the candidate automated assistant action with the ML output with the highest probability. As yet another example, if there are multiple candidate automated assistant actions whose rule outputs indicate satisfaction of rule(s), it can be determined to cause automatic performance of the candidate automated assistant action with the highest confidence measure (generated in optional block 304A).

Turning now to FIG. 4, optional sub-blocks of block 308 of method 300 FIG. 3 are illustrated. In performing block 308 of method 300 of FIG. 3, one or more multiple of the sub-blocks can optionally be performed. Each of the sub-blocks of FIG. 4 describes generation of corresponding environmental feature(s).

At sub-block 308A, the system generates temporal feature(s) indicative of current temporal condition(s). The system can generate the temporal feature(s), for example, using a local clock and/or local calendar. As one particular example, a temporal feature can be generated that indicates a time of day with a level of discretization such as one of "weekday morning", "weekend morning", "weekday afternoon", "weekend afternoon", "weekday evening", or "weekend evening".

At sub-block 308B, the system generates environment location feature(s) indicative of semantic classification(s) of the environment. The system can generate the environment location feature(s) based on, for example, location data from an assistant device at which the audio was detected, and optionally with reference to one or more databases that correlate the location data with semantic classification(s). For example, an environment location feature can be generated that indicates a semantic classification with a level of discretization such as one of "private location" or "public location".

At sub-block 308C, the system generates spoken utterance feature(s) indicative of an origination location and/or an origination direction of the spoken utterance. The origination location can indicate a location of a user that spoke the spoken utterance (e.g., location relative to the assistant device at which the audio data was detected), whereas an origination direction can indicate whether the user was facing toward the assistant device while speaking the spoken utterance.

Sub-block 308C can optionally include further sub-block 308C1 and/or further sub-block 308C2.

At further sub-block 308C1, the system generates the spoken utterance feature(s) based on vision data. For example, the system can process image(s) from a camera of the assistant device to generate a position of a speaking user, relative to the assistant device, with a level of discretization such as "close", "medium", or "far". As another example, the system can process the image(s) to additionally or alternatively generate an origination direction of the speaking user, relative to the assistant device, with a level of discretization such as "toward" or "away".

At further sub-block 308C2, the system generates the spoken utterance feature(s) based on audio data and using multiple microphones and beamforming and/or an extent of reverberation. For example, in using multiple microphones and beamforming, the system can use known distances between multiple microphones of an assistant device, and temporal differences in detecting the spoken utterance in the audio data at the microphones, to predict a position of the speaking user relative to the assistant device. Also, for example, in using an extent of reverberation, the system can process the audio data to determine an extent of reverberation present in the audio data, and an origination direction of the speaking user, relative to the assistant device, determined based on that extent.

At sub-block 308D, the system generates user activity feature(s) indicative of one or more activities currently engaged in by user(s) of the environment. Sub-block 308D can optionally include further sub-block 308D1 and/or further sub-block 308D2. At further sub-block 308D1, the system generates the user activity feature(s) based on vision data. At further sub-block 308D2, the system generates the user activity feature(s) using audio data and/or other non-vision sensor data. For example, the system can generate a user activity feature that indicates "preparing for dinner" based on sensing of ambient sound(s) that are indicative of preparing for dinner At sub-block 308E, the system generates quantity of people feature(s) indicative of a quantity of people in the environment and, optionally, indicative of a quantity of registered people in the environment and/or a quantity of unregistered people in the environment. A person can be registered, with an assistant device, if they have an account linked to the assistant device and/or if they have their face and/or voice embedding(s) locally stored at the assistant device as a registered embedding.

Sub-block 308E can optionally include further sub-block 308E1 and/or further sub-block 308E2.

At further sub-block 308E1, the system generates the quantity of people feature(s) based on vision data. For example, the system can process image(s), from a camera of the assistant device and captured before (e.g., within the last 2 minutes or other threshold) and/or during a spoken utterance, to determine a quantity of unique people captured in the image(s). For instance, a quantity of unique people can be determined to correspond to the quantity of unique faces that are captured in the processed images. A given captured face can be determined to be unique relative to other captured face(s) by, for example, comparing a face embedding of the captured face to embedding(s) of other captured face(s). In implementations that generate a quantity of people feature that indicates whether people in the environment are registered, generated face embedding(s) for a unique face can be compared with locally stored registered embeddings, and that unique face determined to be registered, or not, based on the comparison.

At further sub-block 308E2, the system generates the quantity of people feature(s) based on audio data and/or other non-vision sensor data. Optionally, further sub-block 308E2 includes yet further sub-block 308E2A in which the system filters out voices from speaker component(s) and/or yet further sub-block 308E2B in which the system generates the quantity of people features based on speaker embeddings from TISID.

For example, at sub-block 308E2 the system can process audio data, detected before (e.g., within the last 5 minutes or other threshold) and/or during a spoken utterance, to determine a quantity of unique human voices captured in the audio data. For instance, a quantity of unique people can be determined to correspond to the quantity of unique human voices that are detected based on processing the audio data. As one example, the system can, at yet further sub-block 308E2A, process each of the segment(s) of the audio data that contain voice activity using a TISID to generate a corresponding voice embedding of the audio data. The system can then cluster the corresponding voice embeddings based on their distances in embedding space. The system can then determine the quantity of unique people based on the quantity of unique clusters. In implementations that generate a quantity of people feature that indicates whether people in the environment are registered, generated voice embedding(s) for a unique voice can be compared with locally stored registered embeddings, and that unique voice determined to be registered, or not, based on the comparison.

In some implementations, in determining the quantity of unique human voices, the system can, at yet further sub-block 308E2B, filter out a candidate human voice, detected in corresponding segment(s) of audio data, from inclusion in the quantity of unique human voices. The system can perform such filtering based on determining that the segment(s) of audio data indicate that the candidate human voice originated from a speaker component of an electronic device as opposed to from a human speaker that is present in the environment. In some of those implementations, the system can determine the candidate human voice originates from a speaker component based on analysis of frequencies of the segment(s) of audio data that correspond to speaking by the candidate human voice. For example, the system can determine it originates from a speaker component if all or a threshold percentage (e.g., 80%, 90%, or other threshold percentage) of the frequencies are all within a certain range of one another, all below a certain upper threshold, and/or are all above a certain lower threshold.

At sub-block 308F, the system generates human-to-device feature(s) that indicate physical context between a mobile battery-powered assistant device (e.g., cell phone, watch) and the user.

At sub-block 308G, the system generates additional and/or alternative features that are each indicative of a corresponding current value for a corresponding state of the environment.

Figure 5:
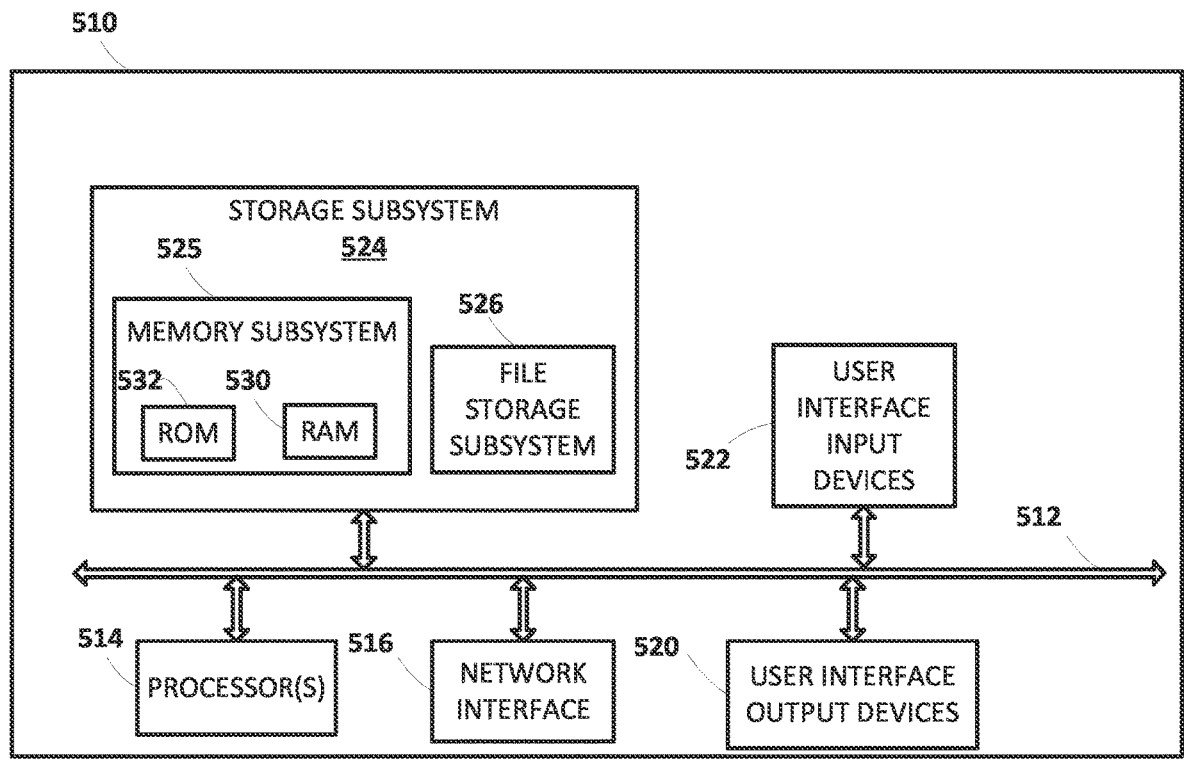
FIG. 5 illustrates an example architecture of a computing device.

FIG. 5 is a block diagram of an example computing device 510 that may optionally be utilized to perform one or more aspects of techniques described herein. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method of FIG. 2, as well as to implement various components depicted in FIGS. 1 and 2A-D.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method is provided that includes performing, independent of any explicit invocation of an automated assistant, ASR on audio data, to generate ASR text that predicts a spoken utterance of a user. The audio data is detected via one or more microphones of a client device in an environment and captures the spoken utterance of the user. The method further includes generating, based on processing the ASR text, a candidate automated assistant action that corresponds to the ASR text, and a confidence measure for the candidate automated assistant action. The method further includes generating one or more environment features that each reflects a corresponding current value for a corresponding dynamic state of the environment. Generating the one or more environment features is based on processing data from the client device and/or from one or more additional client devices in the environment. The method further includes determining whether to cause automatic performance of the candidate automated assistant action responsive to the spoken utterance. Determining whether to cause automatic performance of the candidate automated assistant action is based on processing both: the confidence measure for the candidate automated assistant action, and the one or more environment features. The method further includes, in response to determining to cause automatic performance of the candidate automated assistant action: causing automatic performance of the candidate automated assistant action responsive to the spoken utterance. The method further includes, in response to not determining to cause automatic performance of the candidate automated assistant action: suppressing any automatic performance of the candidate automated assistant action responsive to the spoken utterance.

These and other implementations of the technology disclosed herein can include one or more of the following features.

In some implementations, the method further includes selecting, based on the candidate automated assistant action and from a plurality of candidate semantic categories, a semantic category for the candidate automated assistant action. The semantic category can be a genus category that encompasses a plurality of disparate intents, including an intent of the candidate automated assistant action, and determining whether to cause automatic performance of the candidate automated assistant action is further based on processing the semantic category. In some versions of those implementations, determining whether to cause automatic performance of the candidate automated assistant action includes processing the confidence measure, the one or more environment features, and the semantic category using a trained machine learning (ML) model to generate ML output and determining, based on the ML output, whether to cause automatic performance of the candidate automated assistant action. In some of those versions, the ML output is a probability and determining, based on the ML output, whether to cause automatic performance of the candidate automated assistant action comprises comparing the probability to a threshold. In some additional or alternative versions, determining whether to cause automatic performance of the candidate automated assistant action includes: identifying a rule based on the rule being indexed in association with the semantic category and determining whether to cause automatic performance of the candidate automated assistant action based on applying the confidence measure and the one or more environment features to the rule. In some additional or alternative versions, the candidate automated assistant action is generated based on performing natural language processing on the ASR text, and includes an intent and one or more slot values for one or more corresponding slots of the intent.

In some implementations, determining whether to cause automatic performance of the candidate automated assistant action includes processing the confidence measure and the one or more environment features using a trained machine learning (ML) model to generate ML output and determining, based on the ML output, whether to cause automatic performance of the candidate automated assistant action.

In some implementations, the one or more environment features include a quantity of people feature that is indicative of a quantity of people in the environment. In some versions of those implementations, generating the quantity of people feature includes: processing the audio data and/or additional audio data (e.g., detected via the microphone(s) of the client device prior to detection of the audio data) to determine a quantity of unique human voices captured in the audio data and/or the additional audio data; and generating the quantity of people feature as a function of the quantity of unique human voices. In some of those versions, processing the audio data and/or additional audio data to determine the quantity of unique human voices captured in the audio data and/or the additional audio data includes: determining that given audio data, that corresponds to a candidate human voice, indicates that the candidate human voice originated from a speaker component as opposed to from a human speaker present in the environment; and filtering, from inclusion in the quantity of unique human voices, the candidate human voice in response to determining that the given audio data indicates that the candidate human voice originated from the speaker component. As an example, determining that the given audio data indicates that the candidate human voice originated from the speaker component can include determining that frequencies, of the given audio data, are all within a given frequency range that indicates origination from a speaker component. In some additional or alternative versions, processing the audio data and/or additional audio data to determine the quantity of unique human voices includes: processing the audio data and/or the additional audio data using a text-independent speaker identification model to generate corresponding speaker embeddings; clustering the corresponding speaker embeddings; and determining the quantity of unique human voices based on a quantity of clusters from the clustering. In some of those additional or alternative versions, determining the quantity of unique human voices based on the quantity of clusters from the clustering includes: filtering, from inclusion in the quantity of unique human voices, a given cluster of the clusters responsive to determining that given audio data, used to generate the corresponding speaker embeddings of the cluster, indicates origination from a speaker component as opposed to origination from a human speaker present in the environment. In some implementations, the one or more environment features include a temporal feature indicative of one or more current temporal conditions, a spoken utterance origin feature indicative of an origination location and/or origination direction of the spoken utterance, a quantity of people feature that is indicative of a quantity of people in the environment, a user activity feature that is indicative of one or more activities in which the user is currently engaged, and/or an environment location feature that is indicative of one or more semantic classifications of the environment.

In some implementations, the client device is a battery powered mobile device and the one or more environment features include a human-to-device feature that indicates a physical context between the client device and the user. For example, the physical context between the client device and the user, indicated by the human-to-device feature can be in a pocket of the user or being held and near a face of the user.

In some implementations, a method is provided and includes performing, independent of any explicit invocation of an automated assistant, ASR on audio data, to generate ASR text that predicts a spoken utterance of a user. The audio data is detected via one or more microphones of a client device in an environment and captures the spoken utterance of the user. The method further includes generating, based on processing the ASR text, a candidate automated assistant action that corresponds to the ASR text. The method further includes selecting, based on the candidate automated assistant action and from a plurality of candidate semantic categories, a semantic category for the candidate automated assistant action. The semantic category is a genus category that encompasses a plurality of disparate intents, including an intent of the candidate automated assistant action. The method further includes generating one or more environment features that each reflects a corresponding current value for a corresponding dynamic state of the environment. Generating the one or more environment features is based on processing data from the client device and/or from one or more additional client devices in the environment. The method further includes determining whether to cause automatic performance of the candidate automated assistant action responsive to the spoken utterance. Determining whether to cause automatic performance of the candidate automated assistant action is based on processing both the semantic category for the candidate automated assistant action and the one or more environment features. The method further includes, in response to determining to cause automatic performance of the candidate automated assistant action, causing automatic performance of the candidate automated assistant action responsive to the spoken utterance. The method further includes, in response to not determining to cause automatic performance of the candidate automated assistant action, suppressing any performance of the candidate automated assistant action responsive to the spoken utterance.

In some implementations, a method is provided that includes performing, independent of any explicit invocation of an automated assistant, ASR on audio data, to generate ASR text that predicts a spoken utterance of a user. The audio data is detected via one or more microphones of a client device in an environment and captures the spoken utterance of the user. The method further includes generating, based on processing the ASR text, a first candidate automated assistant action that corresponds to the ASR text and a second candidate automated assistant action that corresponds to the ASR text. For example, a first intent of the first candidate automated assistant action can differ from a second intent of the second candidate automated assistant action. The method further includes generating one or more environment features that each reflects a corresponding current value for a corresponding dynamic state of the environment. Generating the one or more environment features is based on processing data from the client device and/or from one or more additional client devices in the environment. The method further includes determining whether to cause automatic performance of the first candidate automated assistant action or the second automated assistant action responsive to the spoken utterance. Determining whether to cause automatic performance of the first candidate automated assistant action or the second automated assistant action responsive to the spoken utterance includes: generating first output based on processing the one or more environment features along with one or more first features of the first automated assistant action; generating second output based on processing the one or more environment features along with one or more second features of the second automated assistant action; and selecting one of the first candidate action and the second candidate action based on comparing the first output to the second output. The method further includes causing, responsive to the spoken utterance, automatic performance of the selected one of the first candidate action and the second candidate action.

In some implementation, the one or more first features include a first confidence measure for the first automated assistant action and/or a first semantic category for the first automated assistant action, and the one or more second features include a second confidence measure for the second automated assistant action and/or a second semantic category for the second automated assistant action.

What is claimed is:

1. A method implemented by one or more processors, the method comprising:
performing, independent of any explicit invocation of an automated assistant, automatic speech recognition (ASR) on audio data, to generate ASR text that predicts a spoken utterance of a user, wherein the audio data is detected via one or more microphones of a client device in an environment and captures the spoken utterance of the user;
generating, based on processing the ASR text:
a candidate automated assistant action that corresponds to the ASR text, and
a confidence measure for the candidate automated assistant action;
generating one or more environment features that each reflects a corresponding current value for a corresponding dynamic state of the environment,
wherein generating the one or more environment features is based on processing data from the client device and/or from one or more additional client devices in the environment, and
wherein the one or more environment features comprise one or more of:
a temporal feature indicative of one or more current temporal conditions,
a spoken utterance origin feature indicative of an origination location and/or origination direction of the spoken utterance,
a quantity of people feature that is indicative of a quantity of people in the environment,
a user activity feature that is indicative of one or more activities in which the user is currently engaged, or
an environment location feature that is indicative of one or more semantic classifications of the environment;
determining whether to cause automatic performance of the candidate automated assistant action responsive to the spoken utterance, wherein determining whether to cause automatic performance of the candidate automated assistant action is based on processing both:
the confidence measure for the candidate automated assistant action, and
the one or more environment features; and
in response to determining to cause automatic performance of the candidate automated assistant action:
causing automatic performance of the candidate automated assistant action responsive to the spoken utterance;
in response to not determining to cause automatic performance of the candidate automated assistant action:
suppressing any automatic performance of the candidate automated assistant action responsive to the spoken utterance.

2. The method of claim 1, further comprising:
selecting, based on the candidate automated assistant action and from a plurality of candidate semantic categories, a semantic category for the candidate automated assistant action, wherein the semantic category is a genus category that encompasses a plurality of disparate intents, including an intent of the candidate automated assistant action;
wherein determining whether to cause automatic performance of the candidate automated assistant action is further based on processing the semantic category.

3. The method of claim 2, wherein determining whether to cause automatic performance of the candidate automated assistant action comprises:
processing the confidence measure, the one or more environment features, and the semantic category using a trained machine learning (ML) model to generate ML output; and
determining, based on the ML output, whether to cause automatic performance of the candidate automated assistant action.

4. The method of claim 3, wherein the ML output is a probability and wherein determining, based on the ML output, whether to cause automatic performance of the candidate automated assistant action comprises comparing the probability to a threshold.

5. The method of claim 2, wherein determining whether to cause automatic performance of the candidate automated assistant action comprises:
identifying a rule based on the rule being indexed in association with the semantic category; and
determining whether to cause automatic performance of the candidate automated assistant action based on applying the confidence measure and the one or more environment features to the rule.

6. The method of claim 2, wherein the candidate automated assistant action is generated based on performing natural language processing on the ASR text, and comprises an intent and one or more slot values for one or more corresponding slots of the intent.

7. The method of claim 1, wherein determining whether to cause automatic performance of the candidate automated assistant action comprises:

processing the confidence measure and the one or more environment features using a trained machine learning (ML) model to generate ML output; and determining, based on the ML output, whether to cause automatic performance of the candidate automated assistant action.

8. The method of claim 1, wherein the one or more environment features comprise the quantity of people feature that is indicative of a quantity of people in the environment.

9. The method of claim 8, wherein generating the quantity of people feature comprises:

processing the audio data and/or additional audio data to determine a quantity of unique human voices captured in the audio data and/or the additional audio data, wherein the additional audio data is detected, via the one or more microphones of the client device, prior to detection of the audio data; and generating the quantity of people feature as a function of the quantity of unique human voices.

10. The method of claim 9, wherein processing the audio data and/or additional audio data to determine the quantity of unique human voices captured in the audio data and/or the additional audio data comprises:

determining that given audio data, that corresponds to a candidate human voice, indicates that the candidate human voice originated from a speaker component as opposed to from a human speaker present in the environment; and filtering, from inclusion in the quantity of unique human voices, the candidate human voice in response to determining that the given audio data indicates that the candidate human voice originated from the speaker component.

11. The method of claim 10, wherein determining that the given audio data indicates that the candidate human voice originated from the speaker component comprises:

determining that frequencies, of the given audio data, are all within a given frequency range that indicates origination from a speaker component.

12. The method of claim 9, wherein processing the audio data and/or additional audio data to determine the quantity of unique human voices comprises:

processing the audio data and/or the additional audio data using a text-independent speaker identification model to generate corresponding speaker embeddings;

clustering the corresponding speaker embeddings; and determining the quantity of unique human voices based on a quantity of clusters from the clustering.

13. The method of claim 12, wherein determining the quantity of unique human voices based on the quantity of clusters from the clustering comprises:

filtering, from inclusion in the quantity of unique human voices, a given cluster of the clusters responsive to determining that given audio data, used to generate the corresponding speaker embeddings of the cluster, indicates origination from a speaker component as opposed to origination from a human speaker present in the environment.

14. The method of claim 1, wherein the one or more environment features comprise two or more of:

the temporal feature indicative of one or more current temporal conditions;

the spoken utterance origin feature indicative of an origination location and/or origination direction of the spoken utterance;

the quantity of people feature that is indicative of a quantity of people in the environment;

the user activity feature that is indicative of one or more activities in which the user is currently engaged; or the environment location feature that is indicative of one or more semantic classifications of the environment.

15. The method of claim 1, wherein the client device is a battery powered mobile device and wherein the one or more environment features comprise a human-to-device feature that indicates a physical context between the client device and the user.

16. The method of claim 15, wherein the physical context between the client device and the user, indicated by the human-to-device feature is in a pocket of the user or being held and near a face of the user.

17. A method implemented by one or more processors, the method comprising:

performing, independent of any explicit invocation of an automated assistant, automatic speech recognition (ASR) on audio data, to generate ASR text that predicts a spoken utterance of a user, wherein the audio data is detected via one or more microphones of a client device in an environment and captures the spoken utterance of the user;

generating, based on processing the ASR text:

a first candidate automated assistant action that corresponds to the ASR text;

a second candidate automated assistant action that corresponds to the ASR text;

generating one or more environment features that each reflects a corresponding current value for a corresponding dynamic state of the environment, wherein generating the one or more environment features is based on processing data from the client device and/or from one or more additional client devices in the environment;

determining whether to cause automatic performance of the first candidate automated assistant action or the second automated assistant action responsive to the spoken utterance, wherein determining whether to cause automatic performance of the first candidate automated assistant action or the second automated assistant action responsive to the spoken utterance comprises:

generating first output based on processing the one or more environment features along with one or more first features of the first automated assistant action, wherein the one or more first features comprise a first confidence measure for the first automated assistant action and/or a first semantic category for the first automated assistant action, generating second output based on processing the one or more environment features along with one or more second features of the second automated assistant action, wherein the one or more second features comprise a second confidence measure for the second automated assistant action and/or a second semantic category for the second automated assistant action, and selecting one of the first candidate action and the second candidate action based on comparing the first output to the second output; and causing, responsive to the spoken utterance, automatic performance of the selected one of the first candidate action and the second candidate action.

18. A method implemented by one or more processors, the method comprising:
- performing, independent of any explicit invocation of an automated assistant, automatic speech recognition (ASR) on audio data, to generate ASR text that predicts a spoken utterance of a user, wherein the audio data is detected via one or more microphones of a client device in an environment and captures the spoken utterance of the user;
- generating, based on processing the ASR text:
  - a candidate automated assistant action that corresponds to the ASR text, and
  - a confidence measure for the candidate automated assistant action;
- generating one or more environment features that each reflects a corresponding current value for a corresponding dynamic state of the environment,
  - wherein generating the one or more environment features is based on processing data from the client device and/or from one or more additional client devices in the environment;
- determining whether to cause automatic performance of the candidate automated assistant action responsive to the spoken utterance, wherein determining whether to cause automatic performance of the candidate automated assistant action comprises:
  - processing the confidence measure and the one or more environment features using a trained machine learning (ML) model to generate ML output; and
  - determining, based on the ML output, whether to cause automatic performance of the candidate automated assistant action; and
- in response to determining to cause automatic performance of the candidate automated assistant action:
  - causing automatic performance of the candidate automated assistant action responsive to the spoken utterance;
- in response to not determining to cause automatic performance of the candidate automated assistant action:
  - suppressing any automatic performance of the candidate automated assistant action responsive to the spoken utterance.

19. The method of claim 18, wherein the one or more environment features comprise a quantity of people feature that is indicative of a quantity of people in the environment.

20. The method of claim 19, wherein generating the quantity of people feature comprises:
- processing the audio data and/or additional audio data to determine a quantity of unique human voices captured in the audio data and/or the additional audio data, wherein the additional audio data is detected, via the one or more microphones of the client device, prior to detection of the audio data; and
- generating the quantity of people feature as a function of the quantity of unique human voices.

* * * * *